United States Patent
Fedorovich

[11] Patent Number: 6,024,362
[45] Date of Patent: Feb. 15, 2000

[54] SEAL CARTRIDGE

[75] Inventor: George Fedorovich, Nacogdoches, Tex.

[73] Assignee: JM Clipper Corporation, Nacogaoches, Tex.

[21] Appl. No.: 09/186,699

[22] Filed: Nov. 6, 1998

Related U.S. Application Data

[63] Continuation-in-part of application No. 08/931,493, Sep. 16, 1997, and a continuation-in-part of application No. 08/923,559, Sep. 4, 1997, which is a continuation-in-part of application No. 08/725,958, Oct. 7, 1996, Pat. No. 5,735,530, which is a continuation of application No. 08/251,268, May 31, 1994, abandoned, which is a continuation-in-part of application No. 08/064,375, May 21, 1993, Pat. No. 5,316,317.

[51] Int. Cl.[7] .............................. F16J 15/32; F16J 15/447
[52] U.S. Cl. ............................................. 277/351; 277/419
[58] Field of Search ...................................... 277/347, 350, 277/351, 412, 418, 419, 420, 421

[56]           References Cited
          U.S. PATENT DOCUMENTS

| | | |
|---|---|---|
| 2,571,352 | 10/1951 | Fast . |
| 2,643,141 | 6/1953 | Bryant . |
| 3,128,104 | 4/1964 | Teske . |
| 3,477,385 | 11/1969 | Tangeman et al. . |
| 4,304,409 | 12/1981 | Orlowski . |
| 4,458,957 | 7/1984 | Greener . |
| 4,576,383 | 3/1986 | Ballard . |
| 4,596,394 | 6/1986 | Schmitt . |
| 4,743,034 | 5/1988 | Kakabaker et al. . |
| 4,763,904 | 8/1988 | Martinie . |
| 4,848,937 | 7/1989 | Hartman et al. . |
| 4,890,941 | 1/1990 | Calafell, II et al. . |
| 4,981,303 | 1/1991 | Matsushima et al. . |
| 5,244,216 | 9/1993 | Rhode . |
| 5,259,628 | 11/1993 | Nisley . |
| 5,290,047 | 3/1994 | Duffee et al. . |
| 5,498,006 | 3/1996 | Orlowski . |
| 5,522,601 | 6/1996 | Murphy . |
| 5,639,095 | 6/1997 | Rhode . |

Primary Examiner—John Beres
Attorney, Agent, or Firm—Dickstein Shapiro Morin & Oshinsky LLP

[57]           ABSTRACT

A seal cartridge adapted to be mounted upon a rotating shaft, including a rotor and a stator, the rotor and stator being arranged to create a labyrinth portion and a contact portion. The rotor includes a radially outwardly directed surface and the stator includes a flange biased toward the rotor surface to create the contact portion. The rotor and stator create a labyrinth portion with a pair of inwardly facing ridges positioned within a pair of outwardly facing grooves. The stator may include a shoulder for positioning the seal cartridge with respect to the housing, or instead a sloped surface. A spring may be used to bias the flange firmly toward the contact surface of the rotor. The rotor may also have a flange which deforms and fits within an annular notch of the stator.

15 Claims, 6 Drawing Sheets 6,024,362

SEAL CARTRIDGE

This is a continuation-in-part of U.S. patent application Ser. No. 08/931,493, filed Sep. 16, 1997, and a continuation-in-part of U.S. patent application Ser. No. 08/923,559, filed Sep. 4, 1997, both of which are continuations-in-part of U.S. patent application Ser. No. 08/725,958, filed Oct. 7, 1996, now U.S. Pat. No. 5,735,530, which is a continuation of U.S. patent application Ser. No. 08/251,268, filed May 31, 1994, now abandoned, which is a continuation-in-part of U.S. patent application Ser. No. 08/064,375, filed May 21, 1993, now U.S. Pat. No. 5,316,317, the entire disclosures of which are incorporated herein by reference.

FIELD OF THE INVENTION

The present invention relates to a device for providing a static and a dynamic seal between a rotatable shaft and a housing. In particular, the present invention relates to a seal cartridge which includes a labyrinth portion and a contact portion, while providing protection to the rotating shaft from contact by the contact portion.

BACKGROUND OF THE INVENTION

Prior art devices for sealing a rotating shaft are disclosed in U.S. Pat. No. 4,022,479 (Orlowski). Seal devices of this type may be used to inhibit oil from escaping out of a bearing housing and/or to inhibit contaminants from working their way into the housing. The prior art devices are formed of at least two ring-shaped members that rotate with respect to each other when the shaft is rotated. One of the members is fixed to the housing and does not rotate. The other member rotates with the rotating shaft.

The two ring members should be located very close together, particularly when the seal device is used to isolate the bearing from small particulate contaminants. Even small quantities of such contaminants are capable of significantly deteriorating the bearing. To prevent such contamination, the two relatively rotatable ring members must be held together very closely, with only a very narrow space therebetween.

The ring members of the Orlowski seal device are connected together by a separate securing means, not shown in the prior art patent. The ring members themselves have no means for establishing and maintaining a narrow spacing therebetween. Therefore, the prior art seal device cannot be manufactured as a unit with a preset, fixed spacing. The spacing between the ring members has to be set when the seal device is installed into the housing. This leaves room for human error outside the control of the device manufacturer. In particular, the Orlowski device can be improperly installed, with the ring members located too far apart to perform satisfactorily. Another problem with the Orlowski device is that the ring members may be separated subsequent to installation, for example by high pressure cleaning spray.

Prior art devices showing labyrinth and/or contact seals are disclosed in U.S. Pat. No. 5,259,628 (Nisley), U.S. Pat. No. 5,028,054 (Peach), and U.S. Pat. No. 4,379,600 (Muller). The device referred to in Muller is a dust seal between an inner race and an outer race. The dust seal is accomplished either through a labyrinth arrangement of L-shaped rings or through a contact seal. The device of Muller provides no mechanism for sealing, either dynamically or statically, fluid from exiting the device.

The device disclosed by Nisley is a seal assembly with a rotor, a housing, a V-ring and a metal ring. The housing and the rotor have alternating teeth and grooves which intermesh to form a labyrinth seal. The metal ring fits within an angular groove in the housing. The V-ring is positioned on the rotor and makes contact with the metal ring on the air side of the device. The device as disclosed by Nisley is, thus, formed of four separate machined pieces, and is relatively expensive to manufacture. Such a seal device, since it has four separate parts which must be fit together, will have correspondingly greater leakage points than a seal device with fewer parts. Further, the V-ring is positioned to make contact with a metal ring, which may wear the V-ring, leading to an opening between the housing and the rotor through which contaminants and fluid may travel.

The device referred to in Peach has, like Nisley, numerous separately machined or formed parts, thus increasing the device's complexity and possibility of leakage.

U.S. Pat. No. 5,522,601 (Murphy) refers to a locking labyrinth sealing assembly where a flange on a rotor wraps around and interlocks with a flange on a stator. The Murphy device, however, fails to disclose or suggest a contact portion on the oil side and a wholly non-contact portion of the seal on the air side, nor does it show the stator contacting the rotor on the oil side. Furthermore, the Murphy device does not include a cartridge device acting as a rotor.

U.S. Pat. No. 4,981,303 (Matsushima et al.) and U.S. Pat. No. 4,596,394 (Schmitt) refer to sealing devices having contact portions on both the oil side and the air side.

SUMMARY OF THE INVENTION

The disadvantages of the prior art are alleviated to a great extent by the present invention which provides a seal cartridge including an interlocked two-piece non-contact labyrinth seal portion, with a rotor and stator, as well as a contact lip seal portion.

In a preferred embodiment of the invention, the seal cartridge includes a rotor, having a contact surface, and a stator, having a flange, whereby the stator and the rotor together form a labyrinth portion and a contact portion, the flange being biased toward the contact surface to create the contact portion.

In one aspect of the invention, the labyrinth portion includes a deformable flange of the rotor which is positioned within an annular notch of the stator.

In another aspect of the invention, the contact portion includes a flange of the stator which is biased toward a surface of the rotor. The flange may be used to prevent oil from leaking up from the housing into the interior of the seal.

In a further aspect of the invention, the stator includes a cover having a shoulder, which may be used to locate and seat the stator against the housing.

In another aspect of the invention, the stator includes a cover having a sloped surface. The sloped surface allows water and/or other contaminants to come out of the seal in applications where the seal is positioned within the housing because there is insufficient room to seat the seal on the housing.

An object of the invention is to provide an interlocked two-piece seal having a labyrinth seal portion and a separate, contact portion for both static and dynamic sealing. Forming the seal of only two pieces is advantageous. A two-piece seal may have fewer leakage paths than a seal having a greater number of pieces. Moreover, a two-piece seal may be more economical to manufacture and more reliable.

Another object of the invention is to provide a contact portion which provides a static seal during flooded conditions.

Another object of the present invention is to provide a seal device that can be easily installed on a shaft without the need to repair or specially finish a worn or damaged shaft.

DETAILED DESCRIPTION OF PREFERRED EMBODIMENTS

Figure 1:
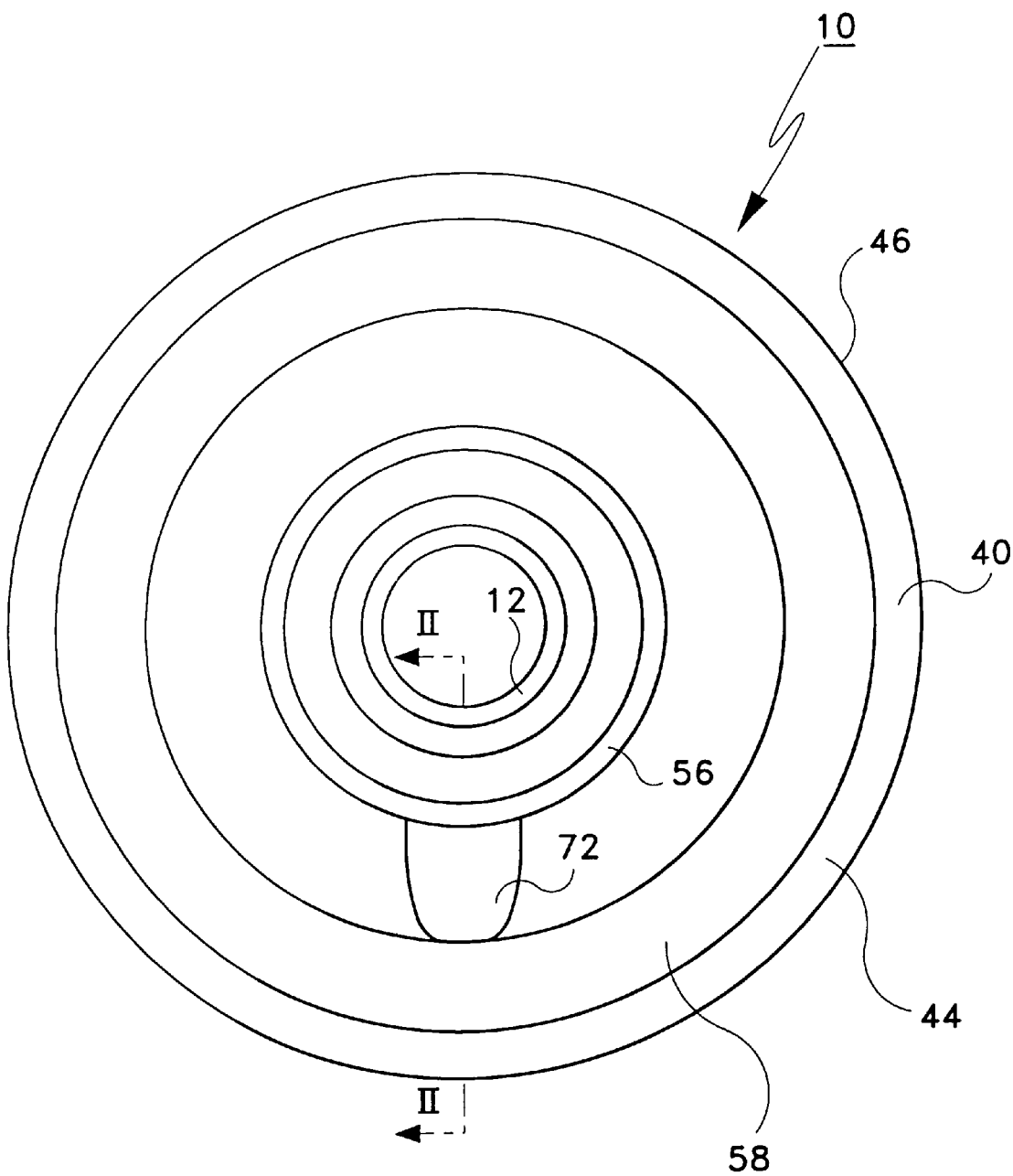
FIG. 1 is a front elevational view of a seal device constructed in accordance with a first embodiment of the present invention.
Figure 2:
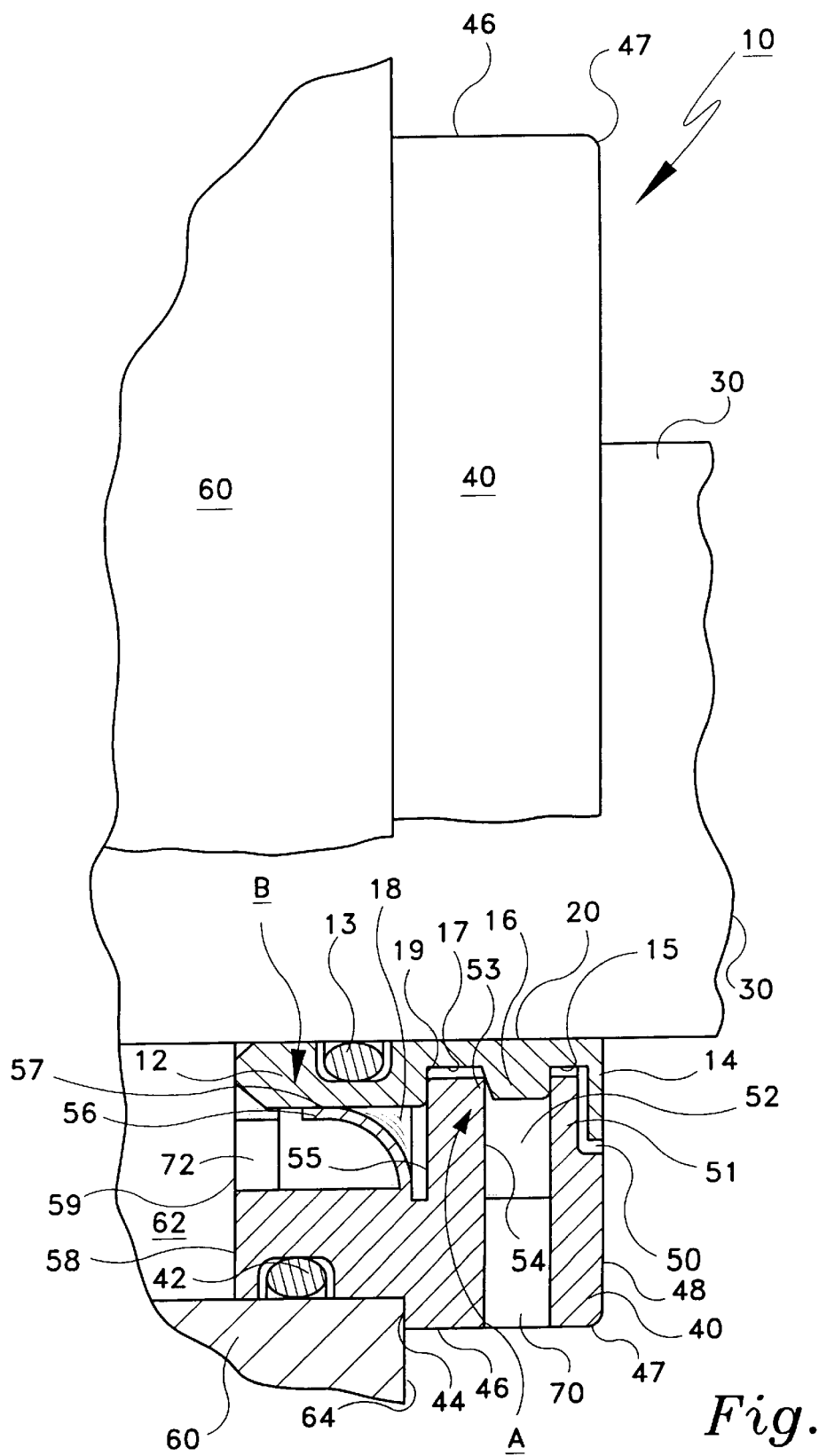
FIG. 2 is a partial cross sectional side view of the seal device of FIG. 1, taken along line II—II of FIG. 1, showing the seal device employed within a sealed system.

Referring now to FIGS. 1 and 2, a seal cartridge 10 is shown having a rotor 12 affixed to a rotatable shaft 30 via an O-ring 13. The seal 10 has a labyrinth portion and a contact portion. As discussed in more detail below, the labyrinth portion has an obstructed or mazelike passageway and provides dynamic and static sealing. The contact portion has a static component that is biased into a contact sealing relationship with the rotating shaft 30.

The rotor 12 includes a connecting flange 14, which is deformable, and an outwardly directed groove 15. In a preferred method of assembly, the flange 14 is machined into its finished shape prior to interlocking the rotor 12 with a stator 40. Alternatively, prior to assembly the flange 14 may be in an undeformed state extending in a direction parallel to the shaft 30, and is deformed after interlocking the rotor 12 with the stator 40. The rotor 12 further includes a shoulder 16, a second radially outwardly directed groove 17, a second shoulder 19 upon which is a radially outwardly directed surface 18, and an inwardly directed face 20.

In the illustrated embodiment, a stator 40 is interlocked with the rotor 12. The stator 40 is affixed to a stationary housing 60 by an O-ring 42. The stator 40 has an inwardly directed shoulder face 44 for locating the stator 40 with respect to the housing 60. The shoulder face 44 may be omitted in an alternative embodiment of the invention (described in more detail below). The stator 40 also has a ring-shaped cover 46 (FIG. 2) extending axially outwardly from the shoulder face 44. The cover 46 has a radial slot-shaped opening 70. The opening 70 is used to direct contaminants out of the seal cartridge 10.

The stator 40 further includes an annular notch 50 and an annular ridge 51, as well as an annular groove 52 and a second annular ridge 53. The second annular ridge 53 has an outwardly directed end face 54 and an oil-side facing surface 55. The stator 40 has a flange 56 resiliently bent downwardly toward the oil side 62 of the housing 60. The flange 56 has a contacting surface 57 which contacts the surface 18 of the rotor 12.

The stator 40 also has a radially extending ring 58. The ring 58 has an end face 59 facing the oil side 62 and includes an axially directed opening 72. The ring 58 acts to deflect oil pulses from bearings or internal gears. The opening 72 provides an opening into the seal 10 from the oil side 62 of the housing 60.

A labyrinth sealing portion A is formed by the flange 14, the shoulders 16, 19 and the outwardly directed grooves 15, 17, all of the rotor 12. In addition, the sealing portion A employs the notch 50, the annular ridges 51, 53, the annular groove 52 and the axially inwardly facing surface 55. When assembled, the elements of the sealing portion A do not contact each other. Instead, they create a labyrinthine pathway, i.e., an obstructed, mazelike, non-contact pathway between the rotor 12 and the stator 40 on the air side of the cartridge 10.

A contact sealing portion B includes the radially outwardly directed surface 18 of the rotor 12 and the flange 56, and its contact surface 57, of the stator 40. When assembled, the flange 56 is biased toward and contacts the rotor surface 18. Through such an arrangement, any oil splashing up from the oil side 62 of the housing 60 up through the opening 72 is prevented from migrating through and out of the seal 10.

During assembly, the rotor 12 is affixed to the shaft 30, and then the stator 40 is interlocked with the rotor 12. The stator 40 is assembled with the rotor 12 by thermally contracting or expanding one of the pieces, such as, for example, expanding the stator 40 to allow the annular ridge 51 to move axially from the oil side 62 of the housing 60 past the shoulder 16 of the rotor 12. It is, however, to be understood that any other method of assembly may be utilized, such as, for example, mechanically expanding the stator 40 by pushing it over the rotor 12, or by a combination of physical and thermal methods, or by any other suitable method.

In operation, the rotor 12 rotates with the shaft 30. The flange 56 prevents oil from traveling from the oil side 62 of the housing 60 beyond the flange 56, due to contact between the flange 56 and the rotor surface 18. Since the contact is on the rotor 12, and not on the shaft 30, there should be no unacceptable damage to the shaft 30, and upon replacement of the seal cartridge 10, the shaft 30 should not have to be repaired.

Furthermore, since the stator flange 56 contacts the rotor 12, it is not necessary to specially finish a worn or damaged shaft 30 to obtain a sufficient seal, since the flange 56 will not encounter any defects or inconsistencies in the shaft 30. In addition, the combination of the axially directed opening 72, the flange 56 and the labyrinth portion A act to prevent leakage of oil from the seal 10. The flange 56, if properly biased toward and contacting the rotor 12, should properly seal against any leakage of oil from the oil side 62 of the housing 60. Nonetheless, the flange 56 may wear, allowing some leakage of oil from the oil side 62 to occur. In such a circumstance, the ring 58 acts as a secondary sealing system. Any oil which leaks into the seal is guided back to the oil side 62 through the opening 72. Further, the labyrinth portion A hinders and reduces any oil leakage past the flange 56. Finally, the axially directed opening 72 is optional, and is best used in applications of the seal 10 in which oil leakage is more critical.

There are applications in which there is a greater likelihood of water infiltration than oil leakage. Such applications include where a seal may be submersed in water or where the shaft is vertically oriented and the oil side 62 is vertically beneath the seal. In such an application, gravity assists in preventing oil leakage from the seal, but the likelihood of water entering the seal is increased. In such applications, a different arrangement of the contacting portion of the seal may be necessary.

Figure 3:
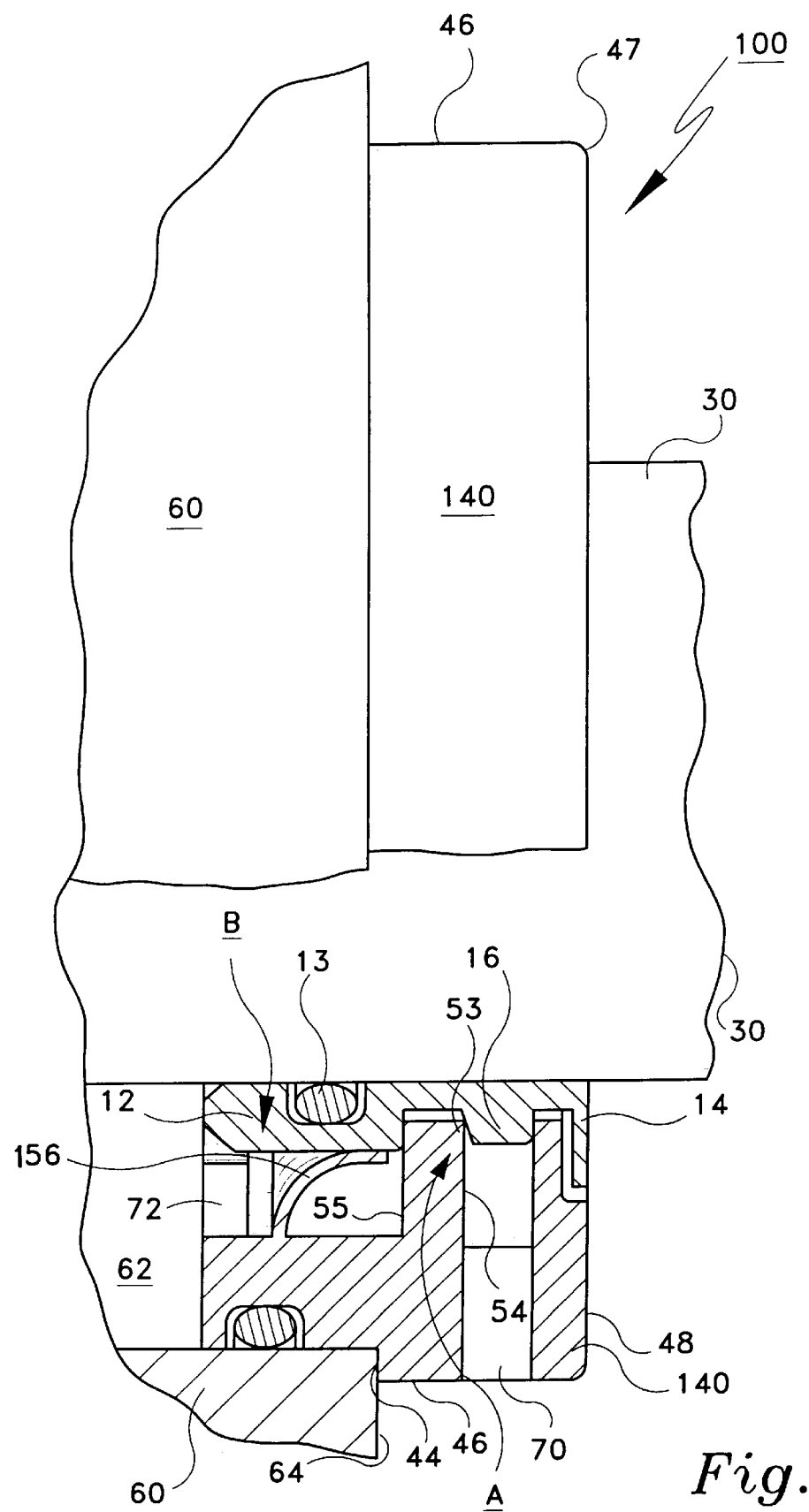
FIG. 3 is a cross sectional side view of a seal device constructed in accordance with a second embodiment of the present invention.

A second preferred embodiment is illustrated in FIG. 3. Specifically, a two-piece, interlocked hybrid seal cartridge 100 is shown having the rotor 12 and a stator 140. The stator 140 is like the stator 40, except that it has a flange 156, which is directed in an axially opposite direction from the flange 56 of seal 10. The flange 156 is preformed. The change in direction of the flange 156 accommodates the need to prevent water from infiltrating to the oil side 62 of the housing 60. A cone may be placed over the flange 156 to protect it during installation.

Figure 4:
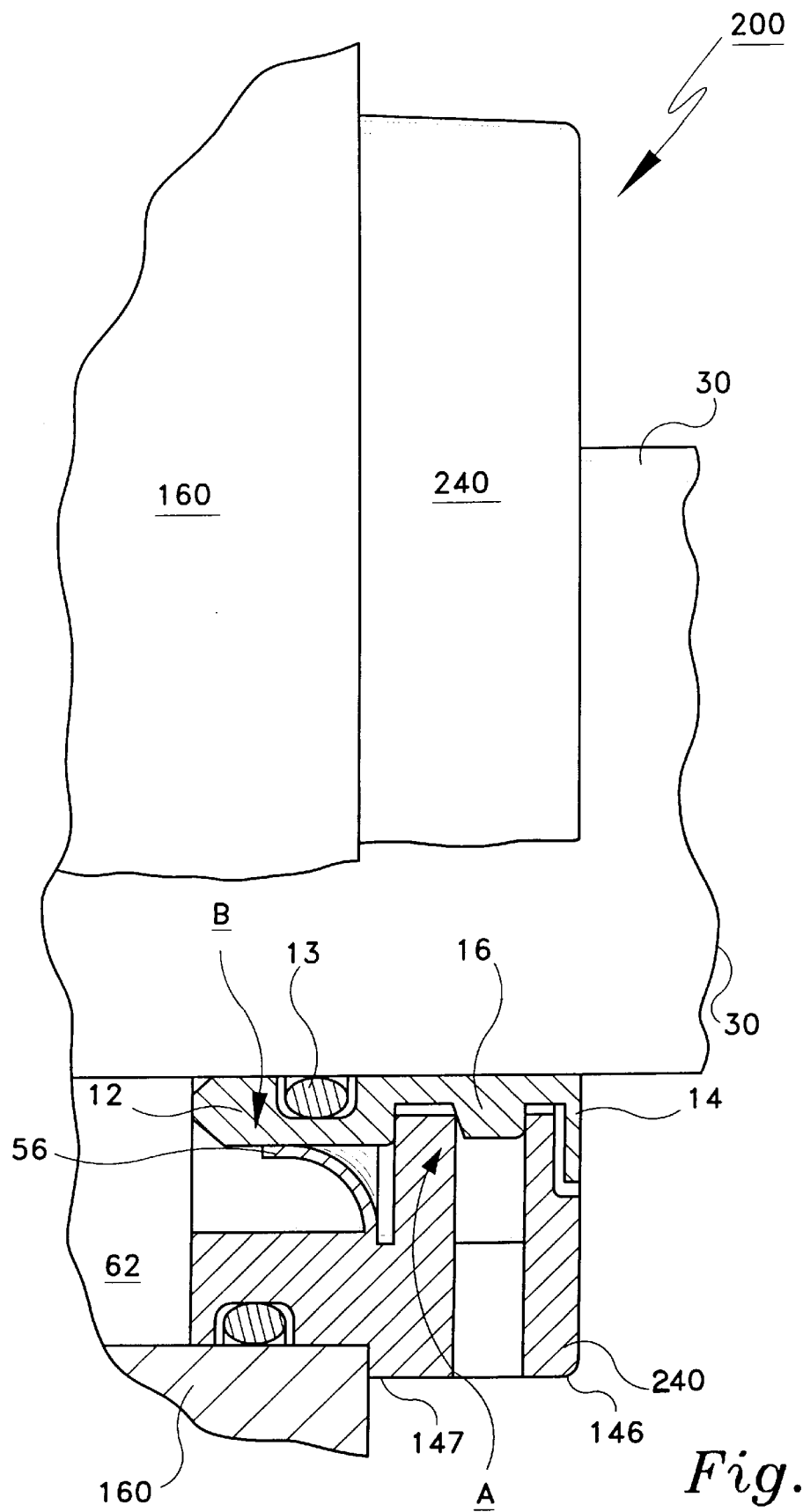
FIG. 4 is a cross sectional side view of a seal device constructed in accordance with a third embodiment of the present invention.

A third preferred embodiment is illustrated in FIG. 4. A two-piece, interlocked seal cartridge 200 is shown having the rotor 12 and a stator 240. The stator 240 is similar to the stator 40 of seal 10 except that it lacks a shoulder 44. The stator 240 also differs from the stator 40 in that it lacks the axially directed opening 72. The seal 200 may be positioned deeper within a housing 160, and is appropriate for arrangements where there is sufficient room within the housing 160 for the seal cartridge 200 but limited room outside the housing 160. The seal cartridge 200 includes a cover 146 having a sloped surface 147 for ease of installation and removal and to provide a pathway for contaminants to exit back into the atmosphere when the seal is installed fully within the housing.

There are applications in which the rotating shaft 30 has an increased run out, or in other words, there is a shaft whip. In such circumstances, seals may be less able to properly seal against leakage because the shaft run out may create intermittent leakage between the shaft and the seal due to the lessened ability of the contact portion of the seal to remain sufficiently biased. Thus, in such applications, the addition of a spring element to the contact portion will provide a more constant loading toward the rotating shaft 30 and will also adjust for variations caused by changes in temperature.

Figure 5:
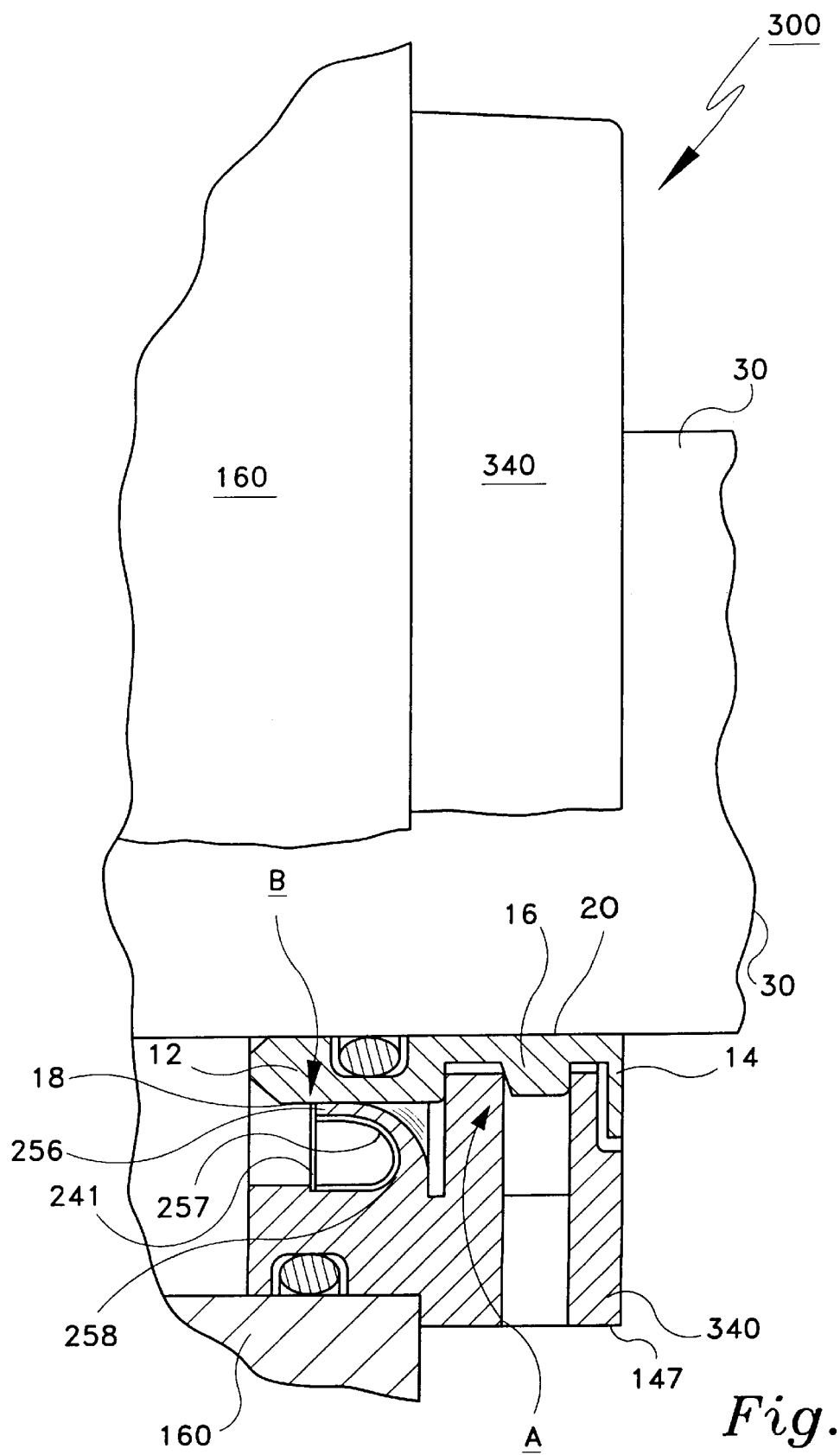
FIG. 5 is a cross sectional side view of a seal device constructed in accordance with a fourth embodiment of the present invention.

A fourth preferred embodiment is illustrated in FIG. 5. A two-piece, interlocked seal cartridge 300 is shown having the rotor 12 and a stator 340. The stator 340 is similar to the stator 240 in that it is utilized with a housing 160 and meant for deeper positioning therein. One difference between the stator 340 and the stator 240 is in the biasing means utilized for the contacting portion 256 of the seal 300. A flange 256 is biased toward the contact surface 18 of the rotor 12 by a spring 257. The spring 257, which is a finger spring, is positioned between the flange 256 and a cut-out 241 of the stator 340.

Figure 6:
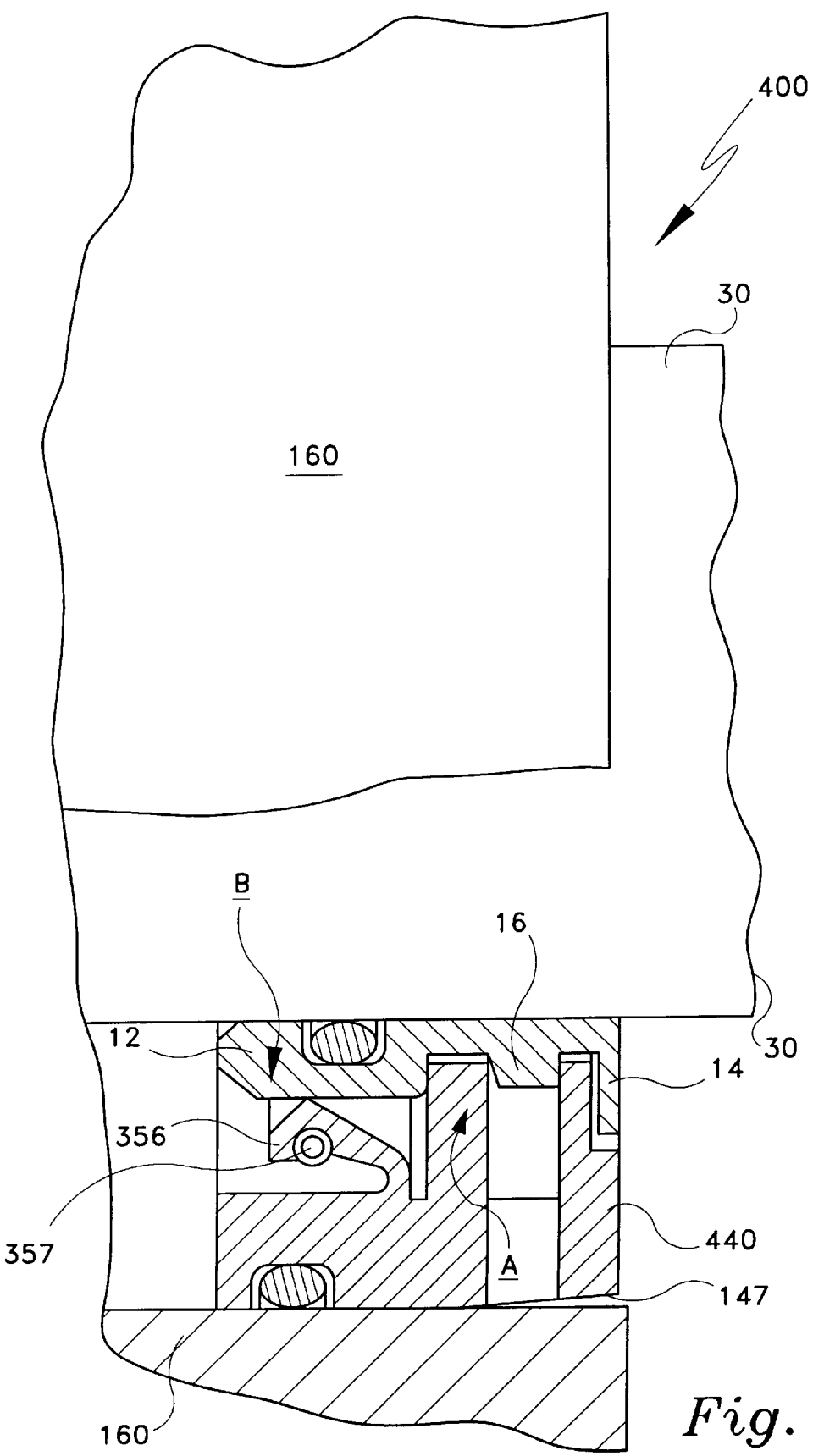
FIG. 6 is a cross sectional side view of a seal device constructed in accordance with a fifth embodiment of the present invention.

A fifth preferred embodiment is illustrated in FIG. 6. Specifically, a two-piece, interlocked seal cartridge 400 is shown having the rotor 12 and a stator 440. The stator 440 is similar to the stators 240, 340 in that it is utilized with the housing 160 and meant for deeper positioning therein. One difference between the stator 440 and the stators 240, 340 is in the biasing means utilized for the contacting portion 356 of the seal 400. The stator 440 uses a garter spring 357 to bias the flange 356 toward the contact surface 18 of the rotor 12. In applications in which oil includes numerous contaminants, the coils of the garter spring 357 may become encrusted. In such applications, the finger spring 256 may be a better alternative. Optionally, an O-ring may be used.

The above description and drawings are only illustrative of certain preferred versions which achieve the objects, features and advantages of the present invention. It is not intended that the present invention be limited to these versions. For example, although two-piece seals are illustrated and described, the present invention is not to be so limited and can include seals with a different number of pieces. Further, although the seals illustrated and described include pieces which interlock one with the other, the present invention may include seals having separate pieces which do not interlock. In addition, while the seals illustrated for use with the housing 160 lack an axially directed opening 72, the seals used with the housing 160 may be formed with the opening 72. Further, the seal illustrated for use with the housing 60 may be formed without the opening 72. Further, the seal embodiments illustrated in FIGS. 1–3 may utilize the biasing means illustrated in FIGS. 4–6 for biasing the flange 56, 156 toward the contact surface 18 of the rotor 12.

What is claimed as new and desired to be protected by a Letters Patent of the United States:

1. A two-piece, interlocked seal device adapted to be mounted upon a rotatable shaft, said seal device comprising:

a rotor having a radially outwardly directed surface, first and second radially outwardly directed grooves on either side of a radially outwardly directed shoulder, and a flange; and a stator having a cover, a flange biased toward said rotor surface, first and second radially inwardly directed ridges on either side of a radially inwardly directed groove, a radial opening adapted to direct contaminants from the seal, and an annular notch;

wherein said stator first ridge is positioned within said rotor first groove and said stator second ridge is positioned within said rotor second groove and said rotor flange is positioned within said stator annular notch to create a labyrinth portion; and wherein said stator flange and said rotor surface create a contact portion.

2. The device of claim 1, wherein said stator includes an axially directed opening adapted to hinder leakage of oil from the seal device.

3. The device of claim 1, wherein said stator includes a garter spring, said spring biasing said stator flange toward said rotor surface.

4. The device of claim 1, wherein said cover includes a sloped surface for locating the seal device with a housing.

5. A sealed system including a housing, a rotatable shaft and a two-piece seal device, said seal device comprising:

a rotor adapted to rotate with said rotatable shaft and relative to said housing, said rotor having a contact surface;

a stator adapted to be affixed to said housing, said stator having a flange biased toward said contact surface and a radial opening adapted to direct contaminants from the seal device;

first and second radially outwardly directed grooves and a radially outwardly directed shoulder on said rotor, each said groove on either side of said shoulder; and first and second radially inwardly directed ridges and a radially inwardly directed groove on said stator, each said ridge on either side of said groove;

wherein said rotor and said stator are arranged so as to create a labyrinth portion and a contact portion and wherein said first ridge is positioned within said first groove of said rotor and said second ridge is portioned within said second groove of said rotor, thereby interlocking said rotor with said stator.

6. The sealed system of claim 5, wherein said rotor includes a flange and said stator includes an annular notch, said rotor flange being positioned within said annular notch.

7. The sealed system of claim 6, wherein said rotor is affixed to said rotating shaft with an O-ring and said stator is affixed to said housing with an O-ring.

8. The sealed system of claim 7, wherein said stator includes an axially directed opening adapted to hinder leakage of oil from the system.

9. The sealed system of claim 7, wherein said stator includes a garter spring, said spring biasing said stator flange toward said contact surface of said rotor.

10. The sealed system of claim 7, wherein said stator includes a sloped surface for locating the seal device with a housing.

11. A sealed system including a housing, a rotatable shaft and a two-piece, interlocked hybrid device, said device comprising:
- a stator adapted to be affixed to said housing, said stator having a cover, a flange biased toward a rotor contact surface, first and second radially inwardly directed ridges on either side of a radially inwardly directed groove, a radial opening adapted to direct contaminants from the system, and an annular notch; and
- a rotor adapted to rotate with said rotatable shaft and relative to said stator, said rotor having first and second radially outwardly directed grooves on either side of a radially outwardly directed shoulder, and a flange;

wherein said stator first ridge is positioned within said rotor first groove and said stator second ridge is positioned within said rotor second groove and said rotor flange is positioned within said stator annular notch to create a labyrinth portion and said stator flange and said contact surface of said rotor creating a contact portion.

12. The sealed system of claim 11, wherein said rotor is affixed to said rotating shaft with an O-ring and said stator is affixed to said housing with an O-ring.

13. The sealed system of claim 12, wherein said stator includes an axially directed opening adapted to hinder leakage of oil from the system.

14. The sealed system of claim 12, wherein said stator includes a garter spring, said spring biasing said stator flange toward said contact surface of said rotor.

15. The sealed system of claim 12, wherein said cover includes a sloped surface for locating the device within a housing.

* * * * *

UNITED STATES PATENT AND TRADEMARK OFFICE
CERTIFICATE OF CORRECTION

PATENT NO. : 6,024,362
DATED : February 15, 2000
INVENTOR(S) : George Fedorovich It is certified that error appears in the above-identified patent and that said Letters Patent is hereby corrected as shown below:

Column 6, line 62, change "portioned" to --positioned--.

Signed and Sealed this

Eighth Day of May, 2001

Attest:

NICHOLAS P. GODICI

Attesting Officer          Acting Director of the United States Patent and Trademark Office